(12) United States Patent
Zerbato et al.

(10) Patent No.: US 8,878,469 B2
(45) Date of Patent: Nov. 4, 2014

(54) PROCESS FOR ELECTRICAL ASSISTANCE TO THE BRAKING OF A VEHICLE AND ASSOCIATED MOTOR SYSTEM

(75) Inventors: Thierry Zerbato, Aiguillon (FR); Pascal Duclos, Gontaud de Nogaret (FR)

(73) Assignee: Polaris Sales Europe SARL, Rolle (CH)

( * ) Notice: Subject to any disclaimer, the term of this patent is extended or adjusted under 35 U.S.C. 154(b) by 406 days.

(21) Appl. No.: 13/295,321

(22) Filed: Nov. 14, 2011

(65) Prior Publication Data

US 2013/0119899 A1   May 16, 2013

(51) Int. Cl.
| | | |
|---|---|---|
| *B60W 10/18* | (2012.01) | |
| *B60W 10/08* | (2006.01) | |
| *B60W 30/18* | (2012.01) | |
| *B60K 1/00* | (2006.01) | |
| *B60W 10/00* | (2006.01) | |
| *B60L 7/26* | (2006.01) | |
| *B60W 10/184* | (2012.01) | |
| *H02P 3/16* | (2006.01) | |

(52) U.S. Cl.
CPC ... *B60K 1/00* (2013.01); *H02P 3/16* (2013.01); *B60Y 2300/89* (2013.01); *B60W 10/08* (2013.01); *B60W 30/18127* (2013.01); *B60W 2510/182* (2013.01); *B60W 10/00* (2013.01); *B60L 7/26* (2013.01); *B60W 10/184* (2013.01)
USPC .......................................... 318/372; 318/375

(58) Field of Classification Search
CPC ................ B60W 20/00; B60W 10/08; B60W 30/18127; B60W 10/188; B60W 2540/12; B60W 20/1062; B60W 2510/081; B60W 2710/182; B60W 10/18; Y10S 903/947; B60T 7/042; B60T 7/085; B60T 8/344; B60L 7/26; B60L 7/18; B60L 11/1803; B60L 2200/36; B60L 2200/40
USPC .................................. 318/370–373, 375–381
See application file for complete search history.

(56) References Cited

U.S. PATENT DOCUMENTS

| | | | | |
|---|---|---|---|---|
| 5,839,800 | A | * | 11/1998 | Koga et al. ..................... 303/152 |
| 5,853,229 | A | | 12/1998 | Willmann et al. |
| 6,021,365 | A | * | 2/2000 | Ishii et al. ........................ 701/22 |
| 6,099,089 | A | * | 8/2000 | Schneider ...................... 303/152 |

(Continued)

FOREIGN PATENT DOCUMENTS

| | | | |
|---|---|---|---|
| FR | 2909957 A1 | 6/2008 | |
| GB | 2386879 A | 10/2003 | |

OTHER PUBLICATIONS

French Search Report, dated Dec. 16, 2010, in Application No. FR 1053565.

*Primary Examiner* — Bentsu Ro
(74) *Attorney, Agent, or Firm* — Faegre Baker Daniels LLP

(57) ABSTRACT

A process for electrical assistance to the braking of a vehicle with a motor system (M), whereby the motor system (M) includes at least one electric motor (10) whose output shaft (14) is coupled to a primary shaft (20) that drives at least one wheel (22) of the vehicle, at least one wheel (22) of the vehicle being equipped with a mechanical braking device that is activated by a hydraulic circuit, whereby the process is characterized in that it includes: collecting information in the hydraulic circuit of the primary braking circuit, and using the information as a set-point for a braking torque generated by the electric motor (10) and exerted on the primary drive shaft (20) of the wheels.

10 Claims, 2 Drawing Sheets

(56) References Cited

Figure 1:
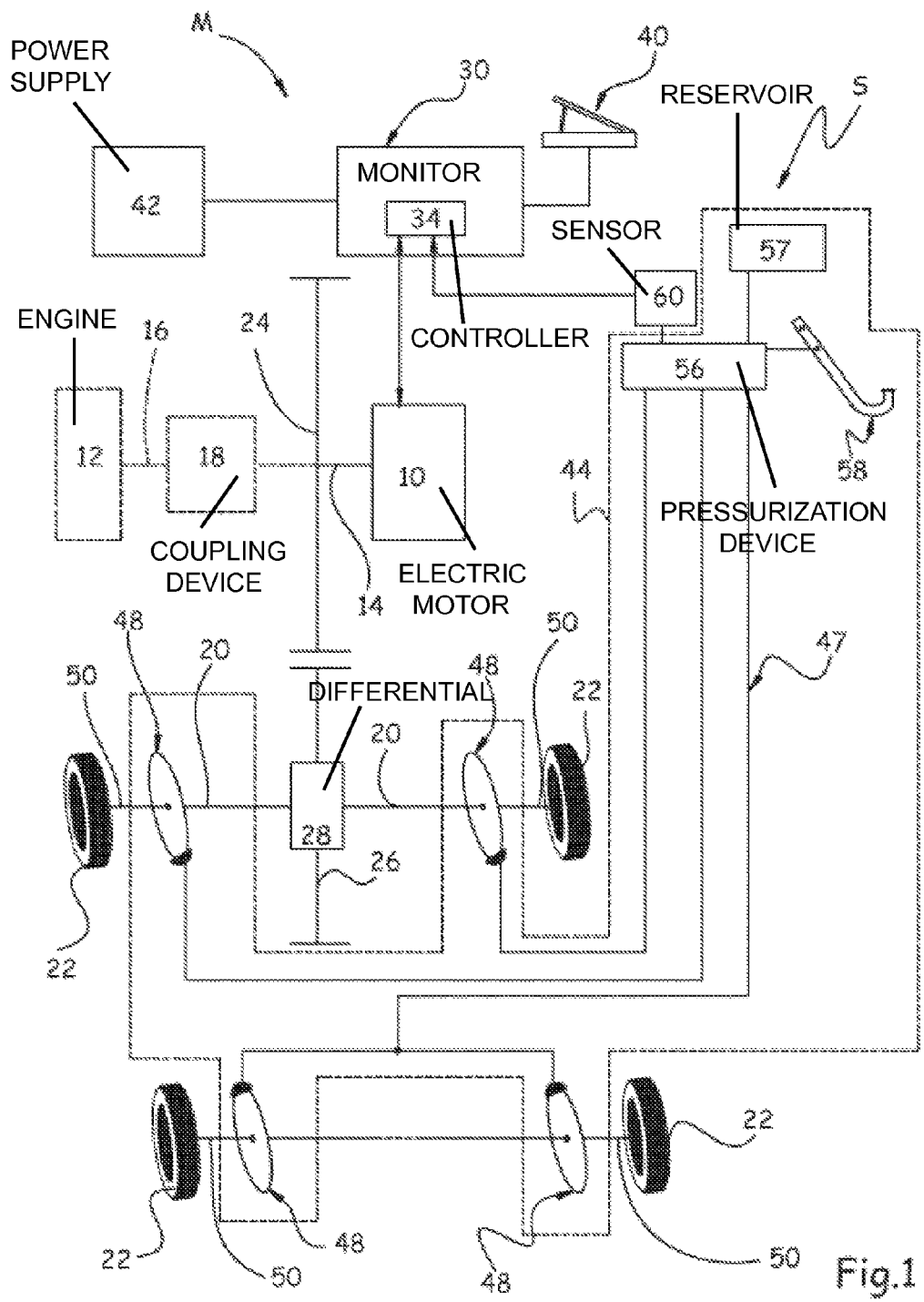

U.S. PATENT DOCUMENTS 8,303,046 B2 * 11/2012 Nakata et al. .................. 303/3
2007/0222287 A1 9/2007 Crombez et al.
2007/0241611 A1 10/2007 Shimada et al.
2007/0296264 A1 12/2007 Haupt et al.

* cited by examiner

PROCESS FOR ELECTRICAL ASSISTANCE TO THE BRAKING OF A VEHICLE AND ASSOCIATED MOTOR SYSTEM

This invention relates to a process for electrical assistance to the braking of a vehicle.

The purpose of the invention is more particularly the category of moderate-speed vehicles.

The invention defines moderate-speed vehicles as vehicles that travel between, for example, 50 km/h and 80 km/h at maximum speed, light vehicles, in particular utility vehicles, urban vehicles, delivery vehicles or short-range vehicles, etc.

These moderate-speed vehicles are used to move individuals or to transport different objects to industrial sites as well as in urban and peri-urban zones.

Thus, the trips that are made with these moderate-speed vehicles are generally short and interspersed with extended stops, so-called "stop and go" use.

On these short trips that are on roads that are often congested and involve making frequent stops and repetitive maneuvers, the use of a vehicle of which the motor system comprises at least one electric motor is particularly advantageous.

Actually, an electric motor does not consume energy upon stopping, has a good output regardless of its speed, and does not produce any noise pollution, unlike an internal combustion engine.

However, for longer trips requiring a longer range, said moderate-speed vehicles can be equipped with a motor system that comprises at least one internal combustion engine.

Thus, in the case of mixed-use, i.e., in which the utility vehicle is to be used on short trips that are interspersed with extended stops, but also on longer trips of several kilometers, the moderate-speed vehicles are equipped with a hybrid motor system with electric motors and internal combustion engines.

Consequently, the invention relates more particularly to the moderate-speed vehicles that are provided with an electric motor system or a hybrid motor system comprising at least one electric motor.

Another drawback that is encountered during the use of these moderate-speed vehicles is derived from the frequency of stops or deceleration actions over the numerous trips made.

Like any vehicle, these moderate-speed vehicles are equipped with a braking system that comprises at least mechanical braking means of at least one wheel of the vehicle.

Also, given the large number and the high frequency of braking or deceleration actions performed during the operation of these vehicles, the mechanical parts tend to wear out very quickly and to lose effectiveness.

This rapid wear and tear of the braking means increases the maintenance fees of these vehicles.

Also, the purpose of this invention is to eliminate the drawbacks of the prior art by proposing a braking assistance process that is easy to use, not having a wearing part, and using the electric motor of a motor system of a moderate-speed vehicle to assist the mechanical braking of one or more wheels of said vehicle, and therefore to reduce the wear and tear and the maintenance cost of the mechanical braking means.

For this purpose, the invention has as its object a process for electrical assistance to the braking of a vehicle with an electric or hybrid motor system, whereby said motor system comprises at least one electric motor whose output shaft is coupled to a primary shaft that drives at least one wheel of the vehicle, at least one wheel of said vehicle being equipped with a mechanical braking device that is activated by means of a hydraulic circuit; said process is characterized in that it consists in collecting information in the hydraulic braking circuit and in using said information as a set-point for a braking torque generated by the electric motor and exerted on the primary drive shaft of the wheels.

Also, in terms of safety and reliability of this process for electrical assistance to the braking, the permanent coupling between the output shaft of the electric motor and the shaft driving the wheels is an important characteristic of the invention.

According to another objective, and simultaneously to the generation of a braking torque, the operation by generator of the electric motor makes it possible to recharge the power-supply means of said electric motor.

Figure 2:
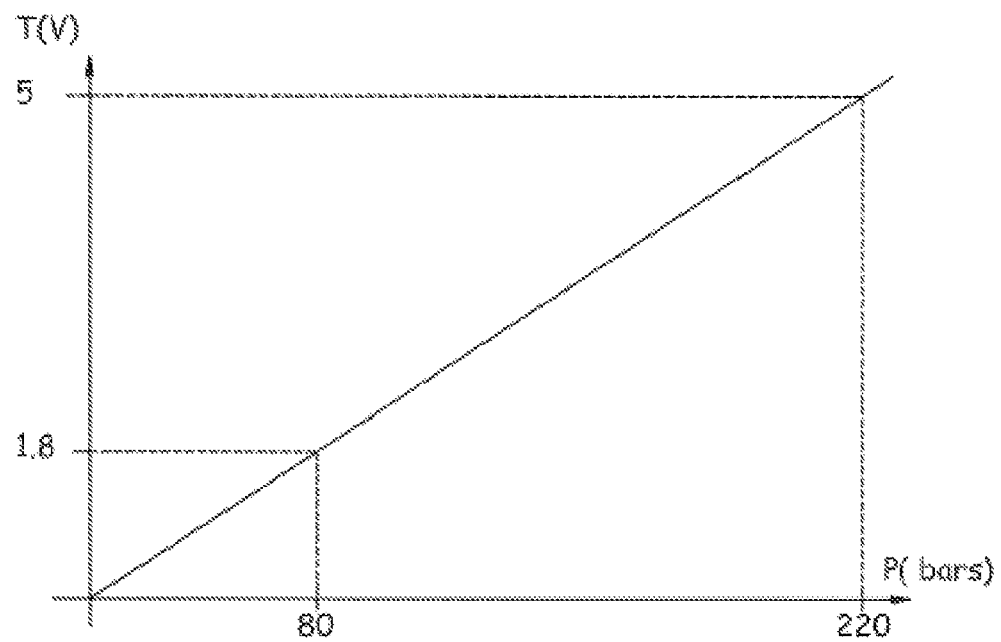
Figure 3:
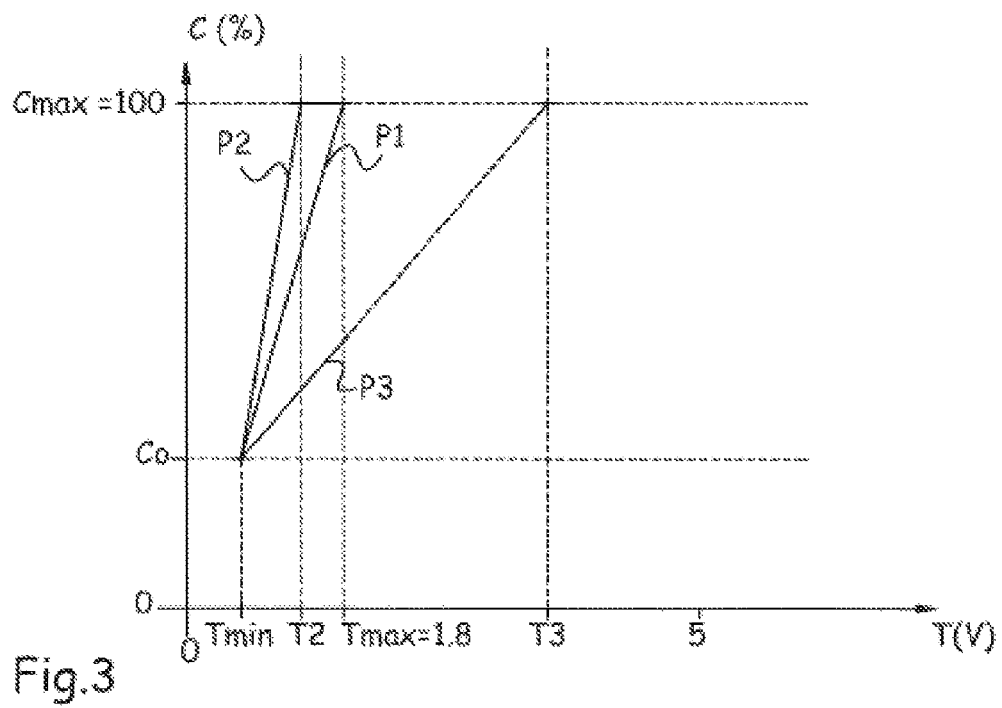

Other characteristics and advantages will emerge from the following description of the invention, a description that is provided only by way of example, relative to the accompanying drawings in which:

FIG. 1 diagrammatically shows a motor system and a mechanical braking system of a moderate-speed vehicle that can allow the implementation of the process for electric assistance to braking according to the invention, FIG. 2 is a diagram that shows the relationship between the pressure that is measured and the output signal of a pressure sensor used for the implementation of the process for electrical assistance to braking according to the invention, FIG. 3 is a diagram that shows the relationship between the set-point of the electric braking torque and the output signal of a pressure sensor used for the implementation of the process for electrical assistance to braking according to the invention.

FIG. 1 diagrammatically shows the design of a motor system M of a vehicle that can make possible the implementation of the process for electrical assistance to braking according to the invention.

The implementation of this process is described for a vehicle with an electric or hybrid motor system, in particular a hybrid electric/internal combustion motor system that can operate in purely electric mode, in electric/internal combustion mode, or in purely internal combustion mode with gradual transitions between each mode.

Of course, the application of this process is not limited to a vehicle with a hybrid internal combustion/electric motor system, whereby the application of the invention requires only a motor system that comprises at least one electric motor that is used for driving at least one wheel of the vehicle.

Thus, in an electrical variant, said motor system M comprises at least one electric motor 10 with a first output shaft 14.

And, in a hybrid variant, said motor system M also comprises at least one internal combustion engine 12, with the output shaft 16 of the internal combustion engine 12 able to be connected to the output shaft 14 of the electric motor by a coupling device 18 in rotation.

So as to achieve an operation of the hybrid motor system M in the different purely internal combustion or electric modes, or hybrid electric/internal combustion modes, the device 18 for coupling in rotation can be disengaged. By being able to be disengaged, the invention means that the coupling device 18 makes it possible to create or to cut the connection in rotation between the output shaft 16 of the internal combustion engine 12 and the output shaft 14 of the electric motor.

By way of example, said coupling device 18 can be a clutch by itself or combined with a transmission, or else an inverter that makes it possible to separate or to connect said shafts in rotation with a variable transmission ratio.

Next, in a motor system M that is adapted for the implementation of this process, the output shaft 14 of the electric motor 10 is coupled to a primary shaft 20 that drives at least one wheel 22 of a vehicle and more particularly a light moderate-speed vehicle.

So as to ensure torque transmission that is reliable and independent of any wearing part, the output shaft 14 of the electric motor 10 is preferably coupled permanently to the primary shaft 20, i.e., without the possibility of disengaging said coupling.

In addition, and still in the same objective of reliability, the transmission of movement between the output shaft 14 of the electric motor 10 and the primary shaft 20 driving the wheels 22 is preferably direct.

By direct transmission, the invention means that no part is inserted between the output shaft 14 and the primary shaft 20 beyond parts that are integral with said shafts (14, 20) and used for implementing said transmission.

Preferably, this permanent and direct transmission takes the form of gearing consisting of a first gearwheel 24 that is integral in rotation and in translation with the output shaft 14 of the electric motor and a second gearwheel 26 that is integral in rotation and in translation of the primary shaft 20.

According to an important characteristic of the invention, the first gearwheel 24 and the second gearwheel 26 therefore make it possible to ensure a direct and permanent, and therefore reliable, transmission of the positive or negative torque generated by the electric motor 10 between the shaft 14 of said electric motor and the primary shaft 20.

Preferably, said second gearwheel 26 is part of a differential 28, and the primary shaft 20 is a wheel train of the vehicle, comprising at least one wheel 22 at each of its ends.

So as to control its operation, the motor system M comprises monitoring means 30 that consist at least of the control means 34 of the electric motor.

Optionally, and in particular in the hybrid variant of said motor system M, said monitoring means 30 can also manage the operation of the internal combustion engine 12 and the coupling device 18.

So as to make it possible to drive the vehicle, said monitoring means 30 are connected to means 40 that can be activated by the user, including at least one analog acceleration pedal.

The electric motor 10 is preferably a brushless-type motor, such as an asynchronous motor or a synchronous motor with a permanent magnet in the rotor, and the control means 34 are based on electronics and power electronics, such as an electronic speed inverter.

The use of a brushless electric motor 10 is particularly advantageous because it involves an electric machine that does not have connection parts and therefore wearing parts, between the rotor and the stator.

Of course, the control means 34 are connected to power-supply means 42 in electrical energy, and they manage the power supply of said electric motor 10 according to a predefined control law and according to the speed to be provided to the primary shaft 20.

Next, in a known way, a vehicle is generally equipped with a braking system.

A braking system S that can equip a moderate-speed vehicle is illustrated in FIG. 1.

Said braking system S generally comprises a primary braking circuit 44, used for slowing or stopping the vehicle during movement.

The primary circuit 44 takes the form of a hydraulic circuit 47 that makes it possible to activate at least one mechanical braking device 48 that is arranged at the level of a wheel 22 of the vehicle.

A braking device 48 can take the form of a disk brake and caliper, or a drum and jaws, whereby the disk or the drum is mounted on the shaft 50 of the wheels 22.

Preferably, each wheel 22, in particular four wheels, of the vehicle is/are equipped with a braking device 48 that is activated by the hydraulic circuit 47 of the primary circuit 44.

The hydraulic circuit 47 is connected to each braking device 48, and it comprises at least one pressurizing device 56 that is connected to a reservoir 57 of hydraulic fluid, in particular oil, the pressurizing device 56 making it possible to vary the pressure of the fluid in said hydraulic circuit 47 under the action of a brake pedal 58.

Whether a disk brake and caliper or a drum and jaws are involved, each braking device 48 comprises wearing parts: the disk and the small plates of the caliper or the drum and the fittings of the jaws.

Given the frequency of the deceleration actions and the large number of stops due to urban, peri-urban, or industrial-site uses of these moderate-speed vehicles, said wearing parts of the braking device 48 have a tendency to wear out quickly.

Also, the shafts 50 of at least one train, in particular front or rear, of two wheels 22, each equipped with a braking device 48, corresponding to the primary shaft 20 that is driven by the motor system M of the vehicle, the process according to the invention provides for generating a braking torque with the electric motor 10 and for applying this braking torque to the primary shaft 20 to assist the mechanical braking implemented by the braking devices 48 under the action of the pressurization of the fluid in the hydraulic circuit 47.

With the brakes being important safety elements of a vehicle and so as to limit the failure of this electrical assistance to braking, it is therefore important that the output shaft 14 of the electric motor 10 be coupled permanently to the primary shaft 20 and that the transmission of movement, and therefore of torque, between the output shaft 14 of the electric motor 10 and the primary shaft 20 driving the wheels 22 is the most direct possible.

So as to implement this electrical assistance to the braking, the process according to the invention consists in collecting information in the hydraulic circuit 47 of the primary braking circuit 44 and in using said information as a set-point for a braking torque generated by the electric motor 10 and exerted on the primary drive shaft 20 of the wheels.

Preferably, the braking torque exerted by the electric motor 10 on the primary drive shaft 20 is proportional to the information collected in the hydraulic braking circuit 47 in such a way that the deceleration action of the vehicle is gradual and that the driver benefits from a braking that is both smooth and effective.

More particularly, the information collected in the hydraulic circuit 47 of the primary braking circuit 44 is a measurement of pressure P of the fluid that is contained in the hydraulic circuit 47.

Preferably, the pressurization device 56 is a master cylinder whose piston rod moves under the action of the brake pedal 58, optionally by means of a power-assisted brake multiplying the force exerted by the driver on said pedal.

Also, said measurement of pressure P is done by a sensor 60 that is placed at the output of the pressurization device 56 of the hydraulic braking circuit 47. More precisely, said sensor 60 can be installed at an unused output of said device 56 or in a bypass at the hydraulic braking circuit 47, in particular close to an output of the device 56 that is connected to said circuit.

Once collected, the information is transmitted to the control means 34 of the electric motor 10 in the form of an analog or digital electrical signal, and said signal is exploited by said control means 34 for the calculation of a set-point C for braking torque applied to the electric motor.

As illustrated in FIG. 2, the measurement of pressure P, in bar, performed by the sensor 60, is transmitted in the form of a signal of electric voltage T to the control means 34.

Preferably, according to the invention, said electrical voltage T of said signal is proportional to the pressure P that is measured in the hydraulic braking circuit 47, with the factor of proportionality between the measured pressure and the voltage at the output of the sensor depending on the characteristics given to said sensor by its manufacturer.

By way of indication, the selected sensor 60 can measure a pressure P that ranges up to 220 bar and that corresponds to an output signal that has a voltage of 5 volts.

With the maximum value of the pressure P of the fluid in the circuit 47 of the braking system S of a moderate-speed vehicle being around 80 bar, the maximum voltage Tmax of the electrical signal used for the calculation of the set-point C for the electrical braking torque is therefore around 1.8 volts.

FIG. 3 illustrates different relationships between the voltage T that exits from the pressure sensor 60 and the set-point C for a braking torque that is applied to the electric motor 10.

Said set-point C is a value that is expressed in terms of percentage of the braking torque that can be delivered by the electric motor 10, the set-point Cmax of 100% that corresponds to the maximum braking torque delivered by the electric motor 10 under its nominal operating conditions.

Preferably, according to the invention, said set-point C for the electrical braking torque is proportional to the voltage T that is obtained from the pressure sensor 60.

Advantageously, so as to easily adjust the power of the braking based on the vehicle and its mass, for example, the proportionality factor K between the output voltage T of the sensor 60 and the set-point C for the braking torque can be parameterized.

Advantageously, said proportionality factor K is parameterized under the control means 34 of the electric motor 10.

Also, said parameterization of the proportionality factor K can be carried out, for example, at the factory based on the characteristics of the vehicle and in such a way as to preserve the attractiveness of driving said vehicle.

Thus, and as illustrated in FIG. 3, a first parameterization P1 consists of a relationship of a proportionality factor K1 that makes the set-point for maximum braking Cmax correspond to the maximum value Tmax of the voltage of the signal at the output of the sensor 60 and therefore to the maximum value of the pressure P set by the fluid in the hydraulic circuit 47.

According to this first parameterization P1, the electrical braking and the mechanical braking are used in the same proportion, with a simultaneous use of their respective maximum capacities.

A second parameterization P2 consists of a relationship of the proportionality factor K2 that makes the set-point of maximum braking Cmax correspond to a value T2 that is less than the maximum value Tmax of the voltage of the signal at the output of the sensor 60.

According to this second parameterization P2, the use of the electrical braking is favored over that of mechanical braking: with the electrical braking being used in a larger proportion than the mechanical braking, and with the maximum capacity of the electrical braking being called up before the maximum capacity of the mechanical brakes.

A third parameterization P3 consists of a relationship of the proportionality factor K3 that makes the set-point for maximum braking Cmax correspond to a value T3 that is greater than the maximum value Tmax of the voltage of the signal at the output of the sensor 60.

According to this third parameterization P3, the use of the electrical braking is limited before that of the mechanical braking: with the electrical braking being used in a smaller proportion than the mechanical braking, and the maximum capacity of the mechanical braking being called up whereas only a part of the maximum capacity of the electrical braking is used.

Also, regardless of the parameterized proportionality factor K, the set-point C for braking is calculated and transmitted instantaneously to the electric motor 10 by the control means 34, and consequently, the electrical braking torque is slaved essentially in real time to the mechanical braking torque.

So as to prevent possible discrepancies due to imprecision or to oscillations of low-value pressure measurements, the invention provides for applying an electrical braking torque to the wheels of the vehicle only when the voltage T of the signal that is obtained from the sensor exceeds a minimum value Tmin.

To provide an order of magnitude, and according to the characteristics set forth above of sensor 60, said minimum voltage Tmin is approximately 0.6 volt.

Advantageously, in particular during use of a hybrid motor system or an all-electrical motor system, it may be advantageous to apply a low braking torque to the primary shaft using the electric motor to simulate the presence of the engine brake as it is perceived on the vehicles with internal combustion engines.

In this case, the information that is collected to control the electric motor 10 and sent back to the control means 34 relates to the release of means 40 that can be activated by the user, such as the acceleration pedal.

More precisely, a set-point Co for the minimum braking torque is parameterized in the control means 34 of the electric motor 10 and transmitted to the electric motor when the acceleration pedal 40 is released.

Consequently, this minimum value Co is also the initial value of the set-point C for braking transmitted to the electric motor when the brake pedal 58 is depressed and the signal obtained from the sensor 60 of the minimum voltage Tmin is exceeded.

Preferably, said minimum set-point Co is taken to be between 10 and 15% of the maximum braking torque delivered by the electric motor 10 under its nominal operating conditions.

Advantageously, when the electric motor 10 exerts a braking torque on the primary shaft 20, said electric motor 10 operates as a generator and is used for recharging the power-supply means 42 in electrical energy.

Thus, during an electrical assistance to the braking or during the simulation of an engine brake, the electric motor 10 makes it possible to recover a part of the kinetic energy of the vehicle and to transform it into electrical energy that recharges the power-supply means 42.

Of course, this invention also covers a moderate-speed vehicle whose motor system comprises at least one electric motor of which the output shaft is coupled to the drive shaft of the wheels and using the process for electrical assistance to the braking, as it was just described.

On the one hand, it is noted that the process according to the invention is not very expensive to adapt to an existing electric or hybrid vehicle.

Actually, only the pressure sensor 60 is to be added to make it possible to implement said process, whereby the hydraulic braking circuit and the control means of the electric motor are already present on the vehicle.

On the other hand, it is also noted that the process according to the invention makes it possible simply to amplify the existing braking on an electric or hybrid vehicle.

The invention claimed is:

1. A process for electrical assistance to the braking of a vehicle with a motor system, wherein said motor system comprises at least one electric motor having an output shaft coupled to a primary shaft that drives at least one wheel of the vehicle, at least one wheel of said vehicle being equipped with a mechanical braking device that is activated by a hydraulic braking circuit, the process comprising collecting information in the hydraulic braking circuit of a primary braking circuit and in using said information as a set-point for a braking torque generated by the electric motor and exerted on the primary drive shaft of the wheels, the information collected in the hydraulic braking circuit being a measurement of pressure of the fluid that is contained in said circuit, said measurement of pressure being carried out by a pressure sensor in communication with an output of a device for pressurization of the hydraulic braking circuit, the measurement of pressure being transmitted to a controller of the electric motor in the form of an electrical signal of electrical voltage, and said signal being used by the controller for the calculation of a set-point for braking torque applied to the electric motor, wherein said set-point for electrical braking torque is proportional to the voltage that is obtained from the pressure sensor and wherein a proportionality factor between the output voltage of the pressure sensor and the set-point for the braking torque is parameterized in the controller of the electric motor, the electrical braking torque being applied to the wheels of the vehicle only when the electrical voltage of the signal from the pressure sensor exceeds a minimum voltage value.

2. The process for electrical assistance to the braking of a vehicle according to claim 1, wherein the output shaft of the electric motor is coupled permanently to the primary shaft.

3. The process for electrical assistance to the braking of a vehicle according to claim 2, wherein said electrical voltage of said signal is proportional to the pressure that is measured in the hydraulic braking circuit.

4. The process for electrical assistance to the braking of a vehicle according to claim 1, wherein said electrical voltage of said signal is proportional to the pressure that is measured in the hydraulic braking circuit.

5. The process for electrical assistance to the braking of a vehicle according to claim 1, wherein a parameterization includes a relationship of proportionality factor making a maximum braking set-point correspond to a maximum value or to a value that is less than the maximum value, or to a value that is greater than the maximum value, of the voltage of the output signal of the pressure sensor.

6. The process for electrical assistance to the braking of a vehicle according to claim 1, further comprising an acceleration pedal connected to a monitor of the motor system, wherein a set-point of minimum braking torque is parameterized in the controller and transmitted to the electric motor when the acceleration pedal is released.

7. The process for electrical assistance to the braking of a vehicle according to claim 6, wherein the minimum value is the initial value of the set-point for braking transmitted to the electric motor when a brake pedal is depressed, and the signal that is obtained from the pressure sensor exceeds the minimum voltage value.

8. The process for electrical assistance to the braking of a vehicle according to claim 1, wherein said electric motor operates as a generator and is used for recharging a power supply when said electric motor exerts a braking torque on the primary shaft.

9. The process for electrical assistance to the braking of a vehicle according to claim 1, wherein the transmission of movement between the output shaft of the electric motor and the primary shaft driving the at least one wheel is direct.

10. A vehicle having a motor system comprising at least one electric motor having an output shaft coupled to a primary shaft that drives at least one wheel of the vehicle and using the process for electrical assistance to braking according to claim 1.

* * * * *